United States Patent [19]

Ramos, Jr.

[11] Patent Number: 5,525,312

[45] Date of Patent: Jun. 11, 1996

[54] SLEEVE FOR PREVENTING CATALYST LOSS THROUGH A REACTOR RATCHETED CENTERPIPE

[75] Inventor: Jose R. Ramos, Jr., Vallejo, Calif.

[73] Assignee: Chevron U.S.A. Inc., San Francisco, Calif.

[21] Appl. No.: 403,591

[22] Filed: Mar. 14, 1995

[51] Int. Cl.$^6$ .......................................................... B01J 8/02
[52] U.S. Cl. .......................... 422/211; 422/212; 422/213; 422/218; 422/219; 422/192
[58] Field of Search ..................................... 422/211, 212, 422/213, 192, 218, 219

[56] References Cited

U.S. PATENT DOCUMENTS

| | | | |
|---|---|---|---|
| 2,212,043 | 8/1940 | Pyzel | 422/211 |
| 2,252,719 | 8/1941 | McCausland | 422/211 |
| 2,980,515 | 4/1961 | Horner et al. | 422/211 |
| 3,112,256 | 11/1963 | Young et al. | 422/211 |
| 4,110,081 | 8/1978 | Millar et al. | 422/213 |
| 4,248,832 | 2/1981 | Acken et al. | 422/177 |
| 4,743,433 | 5/1988 | Smith | 422/220 |

Primary Examiner—N. Bhat
Attorney, Agent, or Firm—E. A. Schaal

[57] ABSTRACT

A reactor has a reactor shell having an internal cavity. Within the reactor shell is an inlet means, which is connected to the internal cavity to afford passage of material into the cavity. Within the bottom of the reactor shell is an outlet means, which is connected to the internal cavity to afford passage of material out of the cavity. A porous scallop means lines a lower portion of the internal surface of the internal cavity, and a cover means rests upon the top of the porous scallop means. A porous, vertical, hollow centerpipe fits within the internal cavity, and below the cover means, to form an annulus between the porous scallop means and the centerpipe. The bottom of that centerpipe rests on a ledge within the outlet means, to block access of flow of solids from the annulus. A blocking sleeve is within the reactor shell for preventing the flow of solids from the annulus to the outlet means even if the centerpipe ratchets upward from the outlet means. The blocking sleeve has an upper band of the blocking sleeve that fits within the bottom end of the centerpipe, a ledge plate having a hole in the plate, wherein the plate is attached to the bottom of the upper band so that the hole of the plate is completely within the diameter of the band, and a lower band attached to the bottom of the ledge plate. The ledge plate rests on the ledge within the outlet means.

4 Claims, 2 Drawing Sheets

SLEEVE FOR PREVENTING CATALYST LOSS THROUGH A REACTOR RATCHETED CENTERPIPE

The present invention relates to chemical reactors, and more particularly to reforming reactors.

BACKGROUND OF THE INVENTION

A common reactor configuration has a reactor shell having an internal cavity that is lined with porous scallops. A porous, vertical, hollow centerpipe fits within the internal cavity, and below a cover means, to form an annulus between the scallops and the centerpipe. That annulus is filled with catalyst. Reactants pass into the reactor through an inlet means within the reactor shell, passes around the cover means, through the scallops, into the annulus, where the reactants are reacted with the catalyst. The reacted products pass through the porous centerpipe, out an outlet means within the bottom of the reactor shell. The bottom of the centerpipe is designed to rest on a ledge within the outlet means.

The centerpipe fits into the outlet. For reasons not fully understood, but having to do at least in part to thermal cycling and the movement of catalyst past the centerpipe, the centerpipe tends to move upward, in an action termed "ratcheting," out of the outlet during use. In fact, the force moving the centerpipe upward is strong enough that, were the centerpipe attached to the reactor floor, using bolts or welds, the force would rip the centerpipe out of the outlet. As the centerpipe moves upward, a space between the pipe and the outlet develops, through which catalyst will flow out of the reactor.

This problem has been recognized for many years, and it continues to be important. Many solutions have been offered, none of them completely satisfactory. One proposed solution was to place a covered cylindrical dam within the annulus so that catalyst would not be lost when the centerpipe ratcheted up. This dam is filled with varying sizes of inert balls. Unfortunately, that solution does not completely prevent catalyst from escaping through the outlet. Some of the catalyst makes its way through the inert balls and out of the reactor. Also, if the centerpipe ratchets up, the inert balls might escape through the outlet.

SUMMARY OF THE INVENTION

The present invention provides a reactor that has a reactor shell having an internal cavity. An inlet means is located within the reactor shell, and is connected to the internal cavity to afford passage of material into the cavity. An outlet means is located within the bottom of the reactor shell, and is connected to the internal cavity to afford passage of material out of the cavity. A porous scallop means lines a lower portion of the internal surface of the internal cavity of the reactor shell. A cover means is located within the internal cavity of the reactor shell, and rests upon the top of the porous scallop means. A porous, vertical, hollow centerpipe fits within the internal cavity of the reactor shell, and below the cover means, to form an annulus between the porous scallop means and the centerpipe. The bottom of the centerpipe rests on a ledge within the outlet means to block access of flow of solids from the annulus.

The problem of catalyst loss is solved with a blocking sleeve, which fits firmly inside the centerpipe, and rests on the ledge which is present in the outlet means in which the centerpipe rests. As shown in the attached figures, the sleeve acts as a dam to stop the flow of catalyst through the opening left by a ratcheting centerpipe. As the centerpipe ratchets up, the sleeve remains in place inside the pipe, collecting and holding leaked catalyst. Only after the centerpipe has moved dangerously high in the outlet means will the catalyst overflow the sleeve. Thus, the sleeve will delay by a considerable amount a shutdown required to refit the centerpipe in the outlet.

The blocking sleeve comes in three parts, so that it can be installed in a reactor full of catalyst. Those three parts are an upper band, a ledge plate having a hole in the plate, and a lower band.

The upper band extends above the ledge plate to provide a dam for leaking catalyst. The upper band fits within the bottom end of the centerpipe. Preferably, the lower part of the upper band has a continuous surface of at least two inches in height, so that no material will leak through the upper band. More preferably, the lower part of the upper band has a continuous surface of at least seven inches in height.

The hole of the ledge plate is completely within the diameter of the upper band. The ledge plate rests on a ledge in the outlet means.

The lower band hangs below the ledge plate to keep the sleeve In place. Preferably, the upper part of the lower band has a continuous surface of at least two inches in height, so that no material will leak through the lower band.

BRIEF DESCRIPTION OF THE DRAWINGS

In order to assist the understanding of this invention, reference will now be made to the appended drawings. The drawings are exemplary only, and should not be construed as limiting the invention.

DETAILED DESCRIPTION OF THE INVENTION

Figure 1:
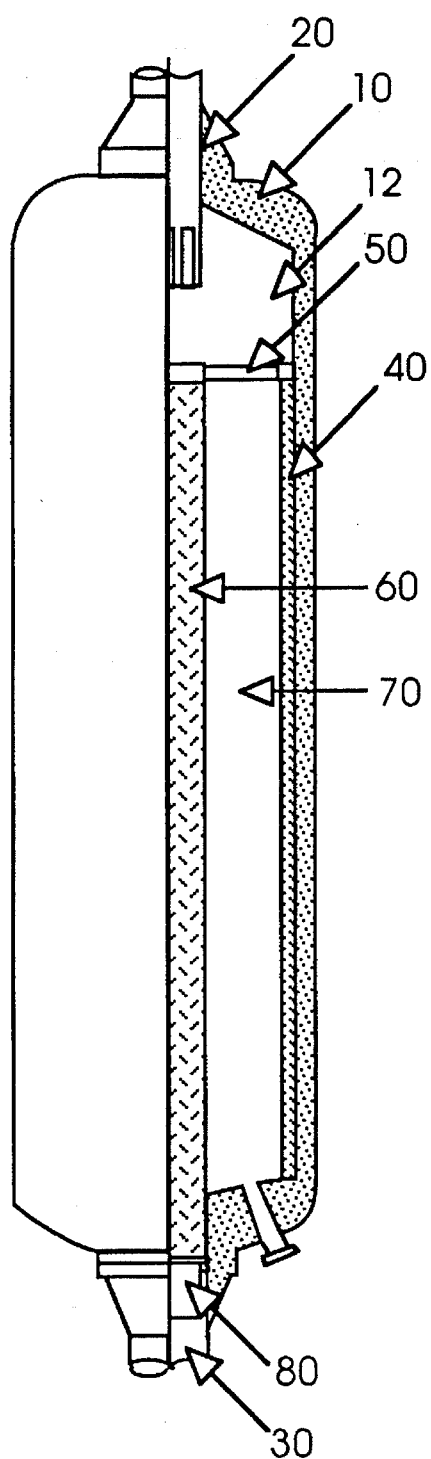
FIG. 1 shows a half cutaway view of a side elevation of one embodiment of the present invention.

In its broadest aspect, the present invention involves a reactor having a reactor shell with an internal cavity.

By "reactor shell," we mean that the reactor has a solid outside and a hollow inside. That hollow inside is the "internal cavity."

Within the reactor shell is an inlet means. The inlet means is connected to the internal cavity to afford passage of material into the cavity. By "inlet means," we mean a device or apparatus for allowing passage of material into the cavity. For instance, the inlet means could be a pipe located in the top of the shell, with an inlet nozzle in the cavity for distributing the material flowing into the cavity.

Also within the reactor shell is an outlet means. That outlet means is within the bottom of the reactor shell, and is connected to the internal cavity to afford passage of material out of the cavity. By "outlet means," we mean a device or apparatus for allowing passage of material out of the cavity. For instance, the outlet means could be a pipe located in the bottom of the shell.

A porous scallop means is used to line a lower portion of the internal surface of the internal cavity of the shell. By "porous scallop means," we mean a series of curved projections that form a porous border. The purpose of the porous scallop means is to diffuse the reactants throughout the catalyst bed.

A cover means is within the cavity of the shell and above the porous scallop means. By "cover means," we mean cover that constricts the catalyst to a catalyst bed of the reactor, preventing the catalyst from flying out of the catalyst bed.

A porous, vertical, hollow centerpipe fits within the cavity of the shell, and below the cover means. It forms an annulus between the porous scallop means and the centerpipe. The bottom of the centerpipe rests within the outlet means to block access of flow of solids from the annulus. The purpose of the centerpipe is offer a pathway for the reaction products to leave the reactor.

The blocking sleeve comes in three parts, so that it can be installed in a reactor full of catalyst. Those three parts are an upper band, a ledge plate having a hole in the plate, and a lower band.

An upper band extends above the ledge plate to provide a dam for leaking catalyst. The upper band of the blocking sleeve fits within the bottom end of the centerpipe. Preferably, the lower part of the upper band has continuous surfaces of at least two inches in height, so that no material will leak through the upper band. More preferably, the lower part of the upper band has a continuous surface of at least seven inches in height.

The ledge plate rests on a ledge in the outlet means, and has a hole in the plate. The hole is completely within the diameter of the upper band.

A lower band hangs below the ledge plate to keep the sleeve In place. The lower band fits within the outlet means. Preferably, the upper part of the lower band has a continuous surface of at least two inches in height, so that no material will leak through the lower band. In one embodiment, the lower band has at least one tab that prevents the blocking sleeve from escaping from the outlet means.

Referring to FIG. 1, which shows a half cutaway view of a side elevation of one embodiment of the present invention, the reactor has a reactor shell 10 having an internal cavity 12. Within the reactor shell, towards the top of the shell, an inlet means 20 is connected to internal cavity 12 to afford passage of material into the cavity. Within the bottom of the reactor shell 10 is an outlet means 30. That outlet means 30 is connected to internal cavity 12 to afford passage of material out of the cavity.

Within internal cavity 12 is a porous scallop means 40 that lines a lower portion of the internal surface of internal cavity 12. Also within internal cavity 12 is a cover means 50 that rests upon the top of porous scallop means 40.

A porous, vertical, hollow centerpipe 60 fits within internal cavity 12, and below cover means 50, to form an annulus 70 between porous scallop means 40 and centerpipe 60. The bottom of centerpipe 60 rests on a ledge within outlet means 30 to block access of flow of solids from annulus 70.

In a reforming reactor, the annulus would contain catalyst. The material flowing into the cavity would be reactants to be reacted. That material flows downward, pass the cover means and through the porous scallop means into the annulus, where it is reacted in the presence of the catalyst. The reaction product flows through the porous centerpipe and out through the outlet means.

A blocking sleeve 80 is within reactor shell 10 for preventing the flow of solids from annulus 70 to outlet means 30, even if centerpipe 60 ratchets upward from outlet means 30.

Figure 2:
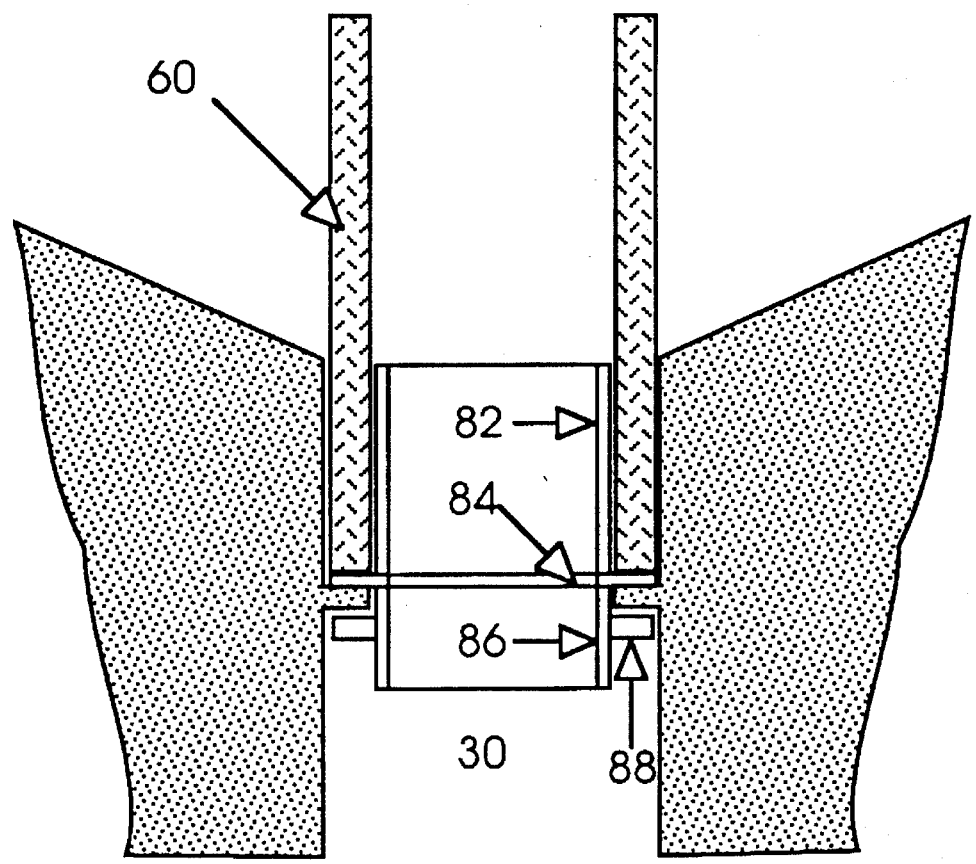
FIG. 2 shows a cutaway view of a side elevation of the blocking sleeve within the outlet means.

Referring to FIG. 2, which shows a cutaway view of a side elevation of one embodiment of the present invention, blocking sleeve 80 has an upper band 82 that fits within the bottom end of centerpipe 60. Blocking sleeve 80 also has a ledge plate 84 that has a hole. Ledge plate 84 is attached to the bottom of upper band 82 so that the hole of ledge plate 84 is completely within the diameter of upper band 82. Blocking sleeve 80 also has a lower band 86 attached to the bottom of ledge plate 84. On lower band 86 are tabs 88 to prevent the blocking sleeve from escaping from the outlet means.

While the present invention has been described with reference to specific embodiments, this application is intended to cover those various changes and substitutions that may be made by those skilled in the art without departing from the spirit and scope of the appended claims.

What is claimed is:

1. A reactor comprising:
    (a) a reactor shell having an internal cavity;
    (b) an inlet means within the reactor shell, wherein the inlet means is connected to the internal cavity to afford passage of material into the cavity;
    (c) an outlet means within the bottom of the reactor shell, wherein the outlet means is connected to the internal cavity to afford passage of material out of the cavity;
    (d) a porous scallop means that lines a lower portion of the internal surface of the internal cavity of the reactor shell;
    (e) a cover means within the internal cavity of the reactor shell, wherein the cover means rests upon the top of the scallop means;
    (f) a porous, vertical, hollow centerpipe that fits within the internal cavity of the reactor shell, and below the cover means, to form an annulus between the porous scallop means and the centerpipe; wherein the bottom of the centerpipe rests on a ledge within the outlet means to block access of flow of solids from the annulus; and
    (g) a blocking sleeve within the reactor shell for preventing the flow of solids from the annulus to the outlet means even if the centerpipe ratchets upward from the outlet means, wherein the blocking sleeve comprises:
        (1) an upper band of the blocking sleeve that fits within the bottom end of the centerpipe;
        (2) a ledge plate having a hole in the plate, wherein the ledge plate is attached to the bottom of the upper band so that the hole of the ledge plate is completely within the diameter of said upper band, and wherein the ledge plate rests on the ledge within said outlet means; and
        (3) a lower band attached to the bottom of the ledge plate within said outlet means.

2. A reactor according to claim 1 wherein the lower part of the upper band and the upper part of the lower band both have continuous surfaces of at least two inches in height.

3. A reactor according to claim 2 wherein the lower part of the upper band has a continuous surface of at least seven inches in height.

4. A reactor according to claim 1 wherein the lower band has at least one tab that prevents the blocking sleeve from escaping from the outlet means.

* * * * *